US011553424B2

(12) United States Patent
Nagamani et al.

(10) Patent No.: US 11,553,424 B2
(45) Date of Patent: Jan. 10, 2023

(54) FAST WAKEUP SIGNAL DETECTOR

(71) Applicant: QUALCOMM Incorporated, San Diego, CA (US)

(72) Inventors: Ganesh Nagamani, Hyderabad (IN); Raghavendra Shyam Ananda, Chickballapur (IN); Srikanth Menon, Hyderabad (IN)

(73) Assignee: Qualcommm Incorporated, San Diego, CA (US)

( * ) Notice: Subject to any disclaimer, the term of this patent is extended or adjusted under 35 U.S.C. 154(b) by 0 days.

(21) Appl. No.: 16/938,609

(22) Filed: Jul. 24, 2020

(65) Prior Publication Data

US 2021/0360526 A1    Nov. 18, 2021

(30) Foreign Application Priority Data

May 14, 2020    (IN) .............................. 202041020398

(51) Int. Cl.
*H04W 52/02* (2009.01)
*H04W 72/04* (2009.01)
(Continued)

(52) U.S. Cl.
CPC ......... *H04W 52/0229* (2013.01); *H04L 5/005* (2013.01); *H04W 68/005* (2013.01); *H04W 72/0446* (2013.01)

(58) Field of Classification Search
CPC ........... H04W 52/0229; H04W 68/005; H04W 72/0446; H04L 5/005
See application file for complete search history.

(56) References Cited

U.S. PATENT DOCUMENTS

2010/0067422 A1*  3/2010 Kadous ............. H04W 52/0229
                                                                    370/311
2018/0124704 A1   5/2018 Jung et al.
(Continued)

FOREIGN PATENT DOCUMENTS

CN       110972237 A    4/2020
KR    20200018389 A    2/2020
(Continued)

OTHER PUBLICATIONS

International Search Report and Written Opinion—PCT/US2021/032473—ISA/EPO—dated Aug. 30, 2021.

*Primary Examiner* — Chae S Lee
(74) *Attorney, Agent, or Firm* — Loza & Loza, LLP

(57) ABSTRACT

Aspects of the disclosure relate to a user equipment (UE) for wireless communication. The UE wakes to monitor for a wakeup signal (WUS) having a maximum WUS duration and configured to indicate an upcoming transmission of a paging signal corresponding to the WUS. The UE detects a reference signal tone energy from tones carrying reference signals, detects a WUS tone energy from tones designated for carrying the WUS, and determines whether the WUS is present or absent based on the WUS tone energy and the reference signal tone energy. The UE then transitions to a sleep state prior to an end of the maximum WUS duration when the WUS is determined to be absent. Alternatively, the UE remains awake when the WUS is determined to be present and receives the paging signal corresponding to the WUS. Other aspects, features, and embodiments are also claimed and described.

27 Claims, 9 Drawing Sheets

(51) Int. Cl.
 *H04W 68/00* (2009.01)
 *H04L 5/00* (2006.01)

(56) References Cited

U.S. PATENT DOCUMENTS

2019/0053321 A1\* 2/2019 Islam ................... H04B 7/0639
2019/0200296 A1  6/2019 Liu et al.
2021/0058909 A1\* 2/2021 Wong .................. H04W 68/025
2021/0235384 A1\* 7/2021 Yang ................... H04B 17/318

FOREIGN PATENT DOCUMENTS

WO   2019108940 A1    6/2019
WO   WO-2019108940 A1 \*  6/2019  .......... H04B 7/0404
WO   2020030738 A1    2/2020
WO   2020060696 A1    3/2020

\* cited by examiner

FAST WAKEUP SIGNAL DETECTOR

CROSS-REFERENCE TO RELATED APPLICATIONS

This application claims priority to and the benefit of Indian Provisional Application Serial No. 202041020398 entitled "FAST WAKEUP SIGNAL DETECTOR" filed on May 14, 2020, the entire contents of said application are incorporated herein by reference as if fully set forth below in its entirety and for all applicable purposes.

TECHNICAL FIELD

The technology discussed below relates generally to wireless communication systems, and more particularly, to wakeup signal configurations for wireless communications. Embodiments can provide and enable techniques for detecting an absence of a wakeup signal prior to an end of a maximum wakeup signal monitoring duration.

INTRODUCTION

Wireless communication systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communication system may include a number of base stations or network access nodes, each simultaneously supporting communication for multiple communication devices, which may be otherwise known as user equipment (UE).

In some wireless communication systems (e.g., Internet of Things (IoT) or enhanced machine type communication (eMTC)), a base station may transmit data to a UE. The base station may signal to the UE that data and/or control information is available for the UE by transmitting a paging message in a downlink channel prior to a data and/or system information transmission. In some cases, the base station and UE may utilize a power saving signal, such as a wakeup signal (WUS), for idle mode paging. The UE may wake from a sleep state upon receiving the WUS and monitor for downlink transmissions (such as the paging message) from the base station. The WUS may have a maximum duration in which the UE may monitor for the WUS before going back into the sleep state (e.g., if the paging message is not received). Waiting the maximum duration may shorten a UE's battery life.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Aspects of the disclosure relate to a user equipment (UE) for wireless communication. The UE wakes to monitor for a wakeup signal (WUS) having a maximum WUS duration and configured to indicate an upcoming transmission of a paging signal. The UE detects a reference signal tone energy from one or more tones carrying reference signals, detects a WUS tone energy from one or more tones designated for carrying the WUS, and determines whether the WUS is present or absent based on the WUS tone energy and the reference signal tone energy (e.g., by comparing the WUS tone energy to a threshold based on the reference signal tone energy). If the UE determines that the WUS is absent, the UE transitions to a sleep state prior to an end of the maximum WUS duration. If the UE determines that the WUS is present, the UE remains awake and receives the paging signal that includes control information for receiving an upcoming data transmission.

In one example, a method of wireless communication at a user equipment (UE) is disclosed. The method includes waking to monitor for a wakeup signal (WUS), the WUS having a maximum WUS duration and configured to indicate an upcoming transmission of a paging signal corresponding to the WUS, detecting a reference signal tone energy from one or more tones carrying reference signals, detecting a WUS tone energy from one or more tones designated for carrying the WUS, determining whether the WUS is present or absent based on the WUS tone energy and the reference signal tone energy (e.g., by comparing the WUS tone energy to a threshold determined based on the reference signal tone energy), transitioning to a sleep state prior to an end of the maximum WUS duration when the WUS is determined to be absent, remaining awake when the WUS is determined to be present, and receiving the paging signal corresponding to the WUS, wherein the paging signal includes control information for receiving an upcoming data transmission.

In another example, a user equipment (UE) for wireless communication is disclosed. The UE includes at least one processor, a transceiver communicatively coupled to the at least one processor, and a memory communicatively coupled to the at least one processor. The at least one processor and the memory are configured to wake to monitor for a wakeup signal (WUS), the WUS having a maximum WUS duration and configured to indicate an upcoming transmission of a paging signal corresponding to the WUS, detect a reference signal tone energy from one or more tones carrying reference signals, detect a WUS tone energy from one or more tones designated for carrying the WUS, determine whether the WUS is present or absent based on the WUS tone energy and the reference signal tone energy (e.g., by comparing the WUS tone energy to a threshold determined based on the reference signal tone energy), transition to a sleep state prior to an end of the maximum WUS duration when the WUS is determined to be absent, remain awake when the WUS is determined to be present, and receive the paging signal corresponding to the WUS, wherein the paging signal includes control information for receiving an upcoming data transmission.

In a further example, a user equipment (UE) for wireless communication is disclosed. The UE includes means for waking to monitor for a wakeup signal (WUS), the WUS having a maximum WUS duration and configured to indicate an upcoming transmission of a paging signal corresponding to the WUS, means for detecting a reference signal tone energy from one or more tones carrying reference signals, means for detecting a WUS tone energy from one or more tones designated for carrying the WUS, means for determining whether the WUS is present or absent based on the WUS tone energy and the reference signal tone energy (e.g., by comparing the WUS tone energy to a threshold determined based on the reference signal tone energy), means for transitioning to a sleep state prior to an end of the maximum WUS duration when the WUS is determined to be absent, means for remaining awake when the WUS is determined to be present, and means for receiving the paging signal corresponding to the WUS, wherein the paging signal includes control information for receiving an upcoming data transmission.

In yet another example, a non-transitory computer-readable medium storing computer-executable code at a user equipment (UE) for wireless communication is disclosed. The non-transitory computer-readable medium includes code for causing a computer to wake to monitor for a wakeup signal (WUS), the WUS having a maximum WUS duration and configured to indicate an upcoming transmission of a paging signal corresponding to the WUS, detect a reference signal tone energy from one or more tones carrying reference signals, detect a WUS tone energy from one or more tones designated for carrying the WUS, determine whether the WUS is present or absent based on the WUS tone energy and the reference signal tone energy (e.g., by comparing the WUS tone energy to a threshold determined based on the reference signal tone energy), transition to a sleep state prior to an end of the maximum WUS duration when the WUS is determined to be absent, remain awake when the WUS is determined to be present, and receive the paging signal corresponding to the WUS, wherein the paging signal includes control information for receiving an upcoming data transmission.

Various method, system, device, and apparatus embodiments may also include additional features. For example, the WUS is present if the WUS tone energy is greater than or equal to the threshold. and the WUS is absent if the WUS tone energy is less than the threshold. In another example, the reference signals are narrowband reference signals (NRS) or cell-specific reference signals (CRS).

In some examples, the UE detects the reference signal tone energy by accumulating reference signal tones. Signal tones can be accumulated across a number of repeated subframe transmissions. Energies of the accumulated reference signal tones can be combined. In another example, the UE detects the reference signal tone energy by pre-multiplying received reference signals with a locally generated copy of a reference signal to form a coherently combined reference signal symbol and determining an energy of the coherently combined reference signal symbol to be the reference signal tone energy.

In a further example, the UE detects the WUS tone energy by accumulating tones designated for carrying the WUS across the number of repeated subframe transmissions, and combining energies of the accumulated tones designated for carrying the WUS. In another example, the UE detects the WUS tone energy by pre-multiplying received WUS with a locally generated copy of WUS to form a coherently combined WUS symbol and determining an energy of the coherently combined WUS symbol to be the WUS tone energy.

In some examples, the threshold is at least equal to the combined energies of the accumulated reference signal tones. In another example, the maximum WUS duration is proportional to a maximum number of repetitions for transmitting the paging signal.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In a similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Aspects of the present disclosure provide and enable techniques for quickly detecting an absence of a wakeup signal (WUS). A WUS can be configured to indicate an upcoming paging signal transmission. A WUS can aid in transitioning to a sleep state prior to an end of a maximum WUS duration to consume less power and extend battery life at a communication device.

Figure 1:
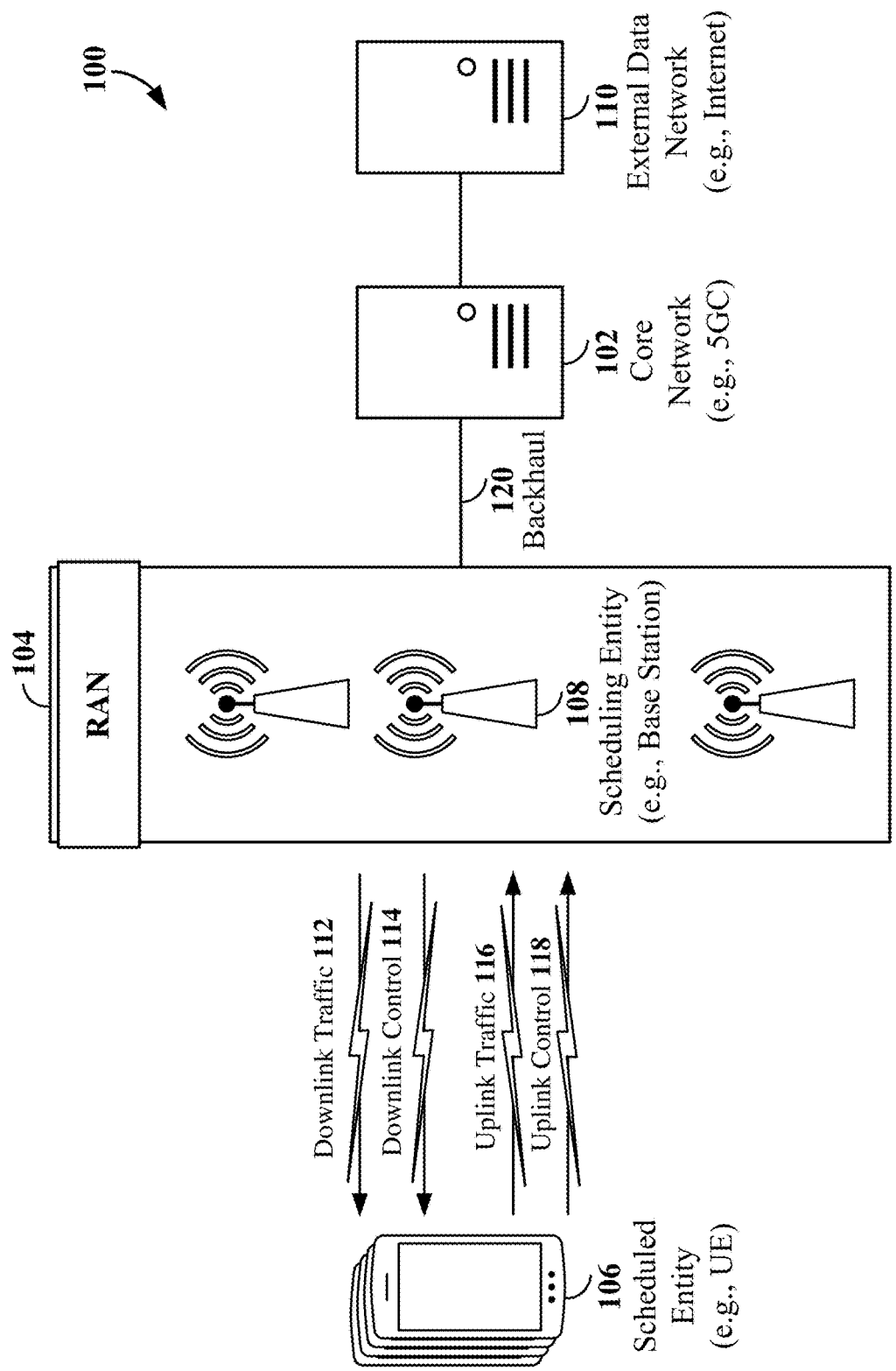
FIG. 1 is a schematic illustration of a wireless communication system according to some aspects.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services. In some examples, a UE may also refer to a wireless local loop (WLL) station, an Internet of Things (IoT) device, and Internet of Everything (IoE) device, or an MTC device, or the like, which may be implemented in various articles such as appliances, vehicles, meters, or the like.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and/or enterprise device; a logistics controller; agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL)

transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
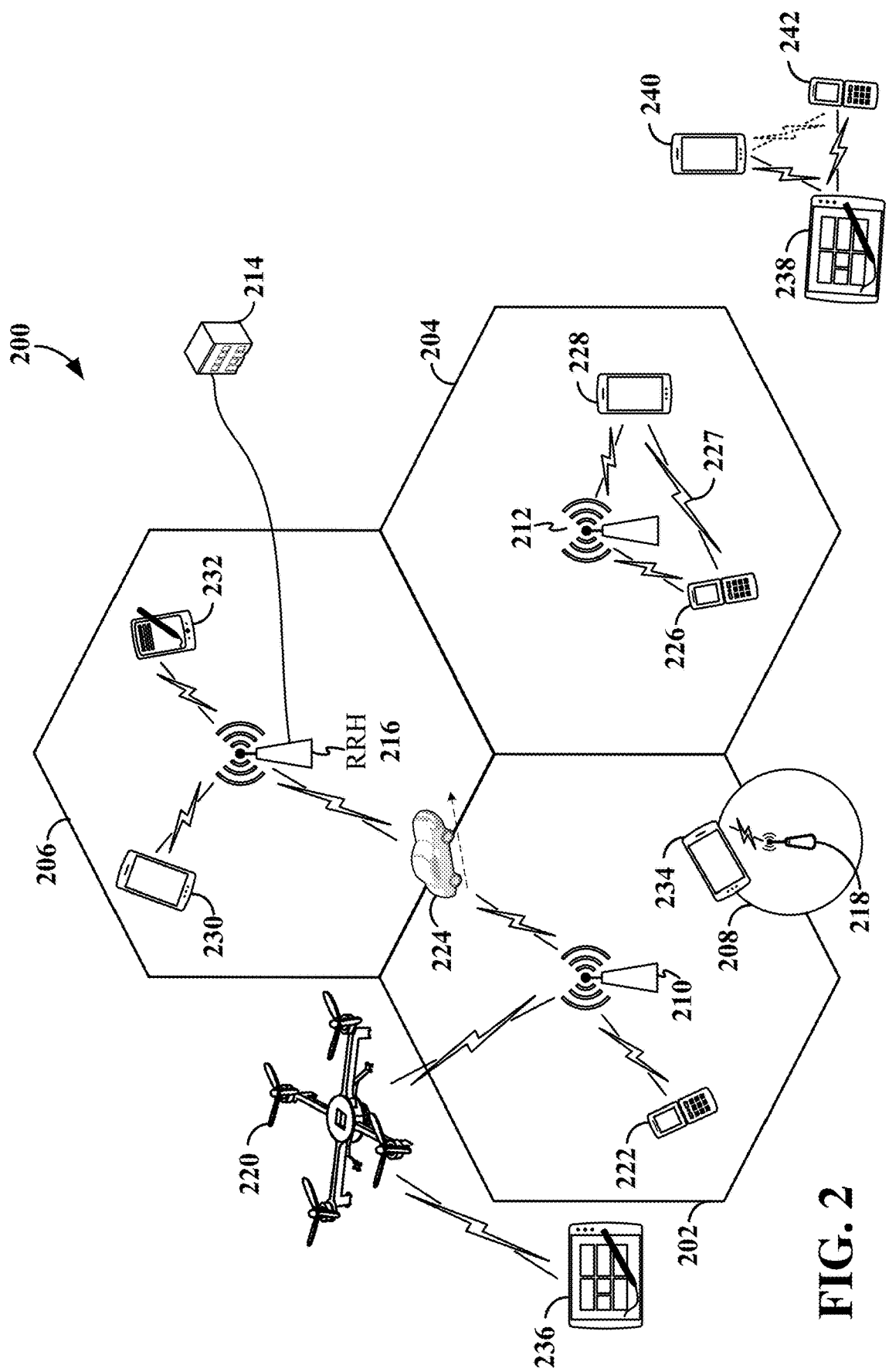
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1). In some scenarios, the AMF may include a security context management function (SCMF). The SCMF can manage in whole or in part, the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks can enable uplink-based mobility framework and improve efficiency of both the UE and the network. Efficiencies may be brought about because the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 3:
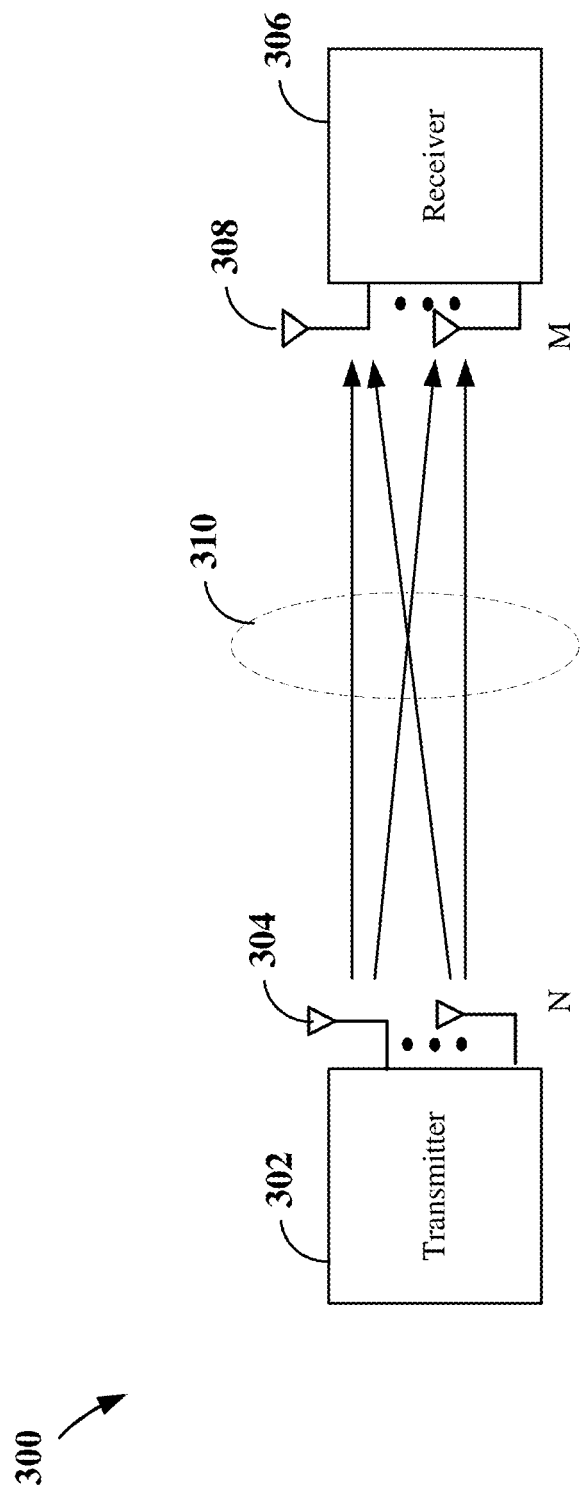
FIG. 3 is a block diagram illustrating a wireless communication system supporting multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feed back the CQI and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

Various aspects of the present disclosure will be described with reference to an OFDM waveform, schematically illustrated in FIG. 4. Yet various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms as well as other waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 4, an expanded view of an exemplary DL subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A UE generally utilizes only a subset of the resource grid 404. An RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each subframe 402 (e.g., a 1 ms subframe) may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., 1, 2, 4, or 7 OFDM symbols). These mini-slots may in some cases be transmitted occupying resources scheduled for ongoing slot transmissions for the same or for different UEs.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Figure 4:
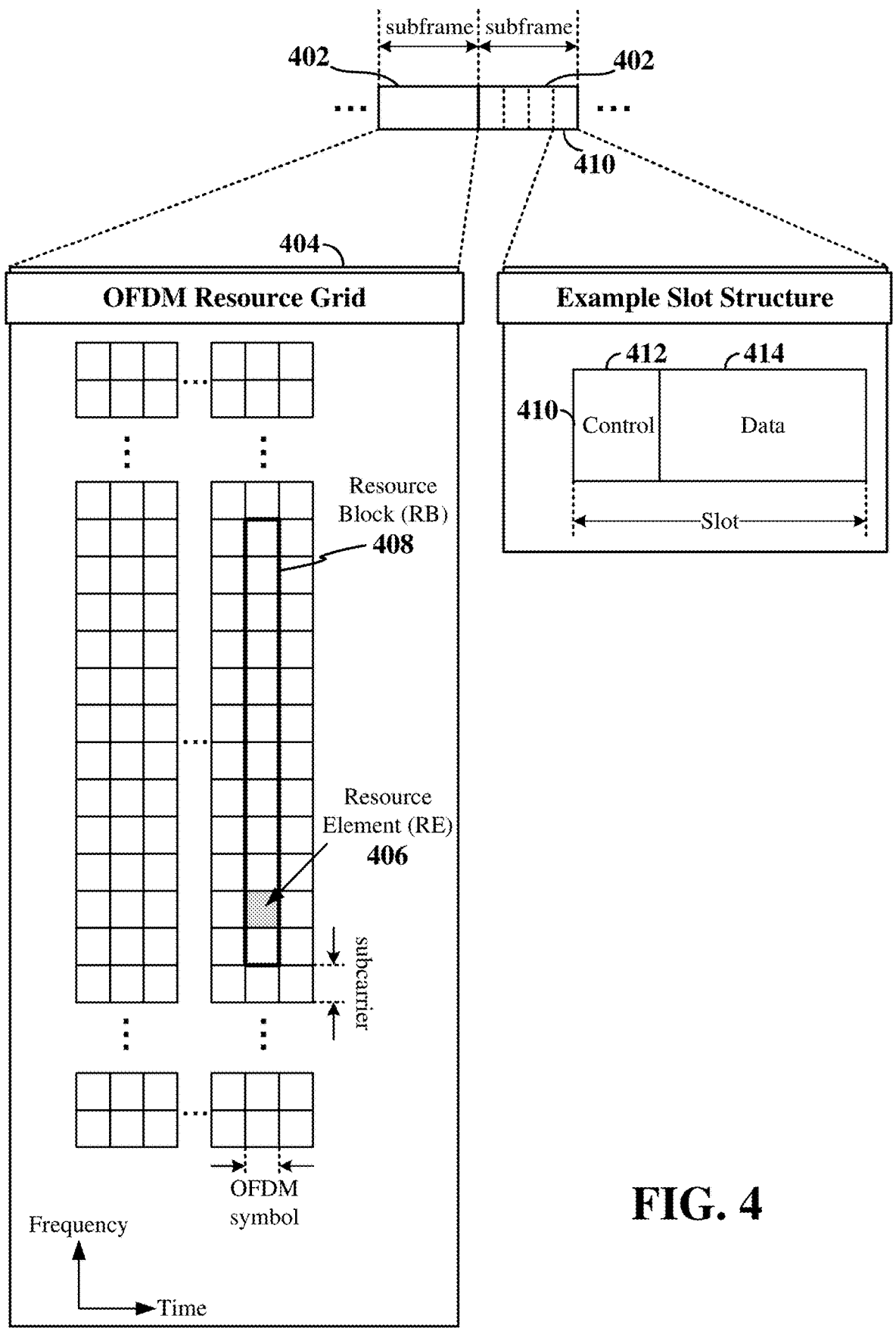
FIG. 4 is a schematic illustration of an organization of wireless resources in an air interface utilizing orthogonal frequency divisional multiplexing (OFDM) according to some aspects.

Although not illustrated in FIG. 4, the various REs 406 within an RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In a DL transmission, the transmitting device (e.g., the scheduling entity 108) may allocate one or more REs 406 (e.g., within a control region 412) to carry DL control information 114 including one or more DL control channels that generally carry information originating from higher layers, such as a physical broadcast channel (PBCH), a physical downlink control channel (PDCCH), etc., to one or more scheduled entities 106. In addition, DL REs may be allocated to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc.

The synchronization signals PSS and SSS (collectively referred to as SS), and in some examples, the PBCH, may be transmitted in an SS block that includes 4 consecutive OFDM symbols, numbered via a time index in increasing order from 0 to 3. In the frequency domain, the SS block may extend over 240 contiguous subcarriers, with the subcarriers being numbered via a frequency index in increasing order from 0 to 239. Of course, the present disclosure is not limited to this specific SS block configuration. Other non-limiting examples may utilize greater or fewer than two synchronization signals; may include one or more supplemental channels in addition to the PBCH; may omit a PBCH; and/or may utilize nonconsecutive symbols for an SS block, within the scope of the present disclosure.

The PDCCH may carry downlink control information (DCI) for one or more UEs in a cell. This can include, but is not limited to, power control commands, scheduling information, a grant, and/or an assignment of REs for DL and UL transmissions.

In an UL transmission, a transmitting device (e.g., a scheduled entity 106) may utilize one or more REs 406 to carry UL control information 118 (UCI). The UCI can originate from higher layers via one or more UL control channels, such as a physical uplink control channel (PUCCH), a physical random access channel (PRACH), etc., to the scheduling entity 108. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the scheduling entity 108 to schedule uplink transmissions. Here, in response to the SR transmitted on the control channel 118, the scheduling entity 108 may transmit downlink control information 114 that may schedule resources for uplink packet transmissions.

UL control information may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In addition to control information, one or more REs 406 (e.g., within the data region 414) may be allocated for user data or traffic data. Such traffic may be carried on one or more traffic channels, such as, for a DL transmission, a physical downlink shared channel (PDSCH); or for an UL transmission, a physical uplink shared channel (PUSCH).

In order for a UE to gain initial access to a cell, the RAN may provide system information (SI) characterizing the cell. This system information may be provided utilizing minimum system information (MSI), and other system information (OSI). The MSI may be periodically broadcast over the cell to provide the most basic information required for initial cell access, and for acquiring any OSI that may be broadcast periodically or sent on-demand. In some examples, the MSI may be provided over two different downlink channels. For example, the PBCH may carry a master information block (MIB), and the PDSCH may carry a system information block type 1 (SIB1). In the art, SIB1 may be referred to as the remaining minimum system information (RMSI).

OSI may include any SI that is not broadcast in the MSI. In some examples, the PDSCH may carry a plurality of SIBs, not limited to SIB1, discussed above. Here, the OSI may be provided in these SIBs, e.g., SIB2 and above.

The channels or carriers described above and illustrated in FIGS. 1 and 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Aspects of the present disclosure enable and provide techniques for quickly detecting a presence or absence of a wakeup signal (WUS). A WUS can be configured to indicate an upcoming paging signal transmission. By detecting the absence of the WUS, a communication device may transition to a sleep state prior to an end of a maximum WUS duration. Accordingly, the communication device may consume less power and extend battery life. Various types of communication devices, such as user equipment (UE) and network components (e.g., base stations), may utilize various aspects to detect the presence or absence of the WUS.

In some wireless communication systems, a base station (e.g., base station 108) may transmit a wakeup signal (WUS) to a UE (e.g., UE 106) using certain time-frequency resources of a downlink channel (e.g., PDCCH, narrow band PDCCH (NPDCCH), or MTC PDCCH (MPDCCH)). If the UE wakes up from a sleep state and detects the WUS, the UE may remain in the wake up state in order to monitor the downlink channel for a paging message (e.g., transmitted by base station) during a paging occasion (PO). Alternatively, if the UE wakes up from the sleep state but does not detect the WUS, there may not be a paging message for the UE in the downlink channel, and the UE may revert back to the sleep state.

As described in some examples herein, a maximum duration of the WUS may extend until the end of the WUS. If the UE does not detect the WUS before the maximum duration of the WUS ends, the UE may revert back to the sleep state. If the UE does detect the WUS before the end of the maximum duration of the WUS, the UE may monitor the subsequent downlink channel for scheduling information specific to the UE. Consequently, if the UE does not receive the scheduling information (e.g., including a UE identification (ID) of the UE) in the downlink channel, the UE may revert back to the sleep state. Alternatively, if the UE does receive the scheduling information, the UE may monitor a successive downlink channel (e.g., physical downlink shared channel (PDSCH), narrowband PDSCH (NPDSCH) or MTC PDSCH (MPDSCH)) for the data, paging message, and/or control information. A base station may configure the maximum duration for the WUS and indicate the maximum duration to the UE (e.g., via a SIB) on a carrier (e.g., NB-IoT carrier or CatM carrier) prior to transmitting the WUS. In some cases, the base station may configure the WUS maximum duration specific to the carrier.

In some examples, the actual WUS transmission duration may be shorter than the maximum duration for a WUS. This shorter WUS transmission duration may be aligned to the start of the configured maximum duration of a WUS or may be aligned to the end of the configured maximum duration of a WUS. Additionally or alternatively, there may be a non-zero time gap between the end of the maximum configured WUS duration and an associated paging occasion. In some examples, this time gap between the end of a WUS and the paging occasion may be predefined. In other examples, this time gap may be dynamically configurable. The base station may indicate a configurable time gap value to the UE explicitly. Alternatively, the base station may indicate a configurable time gap value to the UE implicitly through other configured parameters.

In some cases, a list of possible maximum durations for a WUS may be defined, and the base station may indicate an index to the UE that corresponds to a specific maximum duration for the WUS from the list of possible maximum durations in the SIB (e.g., the SIB that indicates the maximum duration as described above). In some cases, multiple lists may be defined for possible maximum durations for the WUS. For example, the lists of the maximum durations may depend on a maximum number of repetitions value ($R_{max}$) for an associated control channel (e.g., NPDCCH), and the base station may specify the number of lists for the possible maximum durations. Alternatively, the base station may define a single list of possible maximum durations for all $R_{max}$ values.

$R_{max}$ may indicate the maximum number of repetitions for the downlink channel in a paging occasion after a WUS ends. Additionally or alternatively, $R_{max}$ may indicate the possible locations for the downlink channel repetitions in the paging occasion. In some cases, $R_{max}$ may depend on a coverage area associated with the base station. For example, larger coverage areas may correspond to a larger $R_{max}$, and a smaller coverage area may correspond to a smaller $R_{max}$. In some examples, $R_{max}$ may be configured by a higher layer and indicated to the UE in a broadcast signal (e.g., SIB). Alternatively, the value of $R_{max}$ may be known or indicated through legacy signaling (e.g., via SIB2).

In some examples, the $R_{max}$ used for a common search space (e.g., a type1-NPDCCH common search space) may be replaced with a higher layer configured parameter indicating a repetition number of NPDCCHs for a paging message. In some cases, the base station may transmit a smaller number of repetitions (R) than Rmax in a given paging occasion. The UE may not know R before monitoring the paging occasion and may determine the R value based on monitoring the possible locations for a downlink channel repetition in the paging occasion. R may correspond to the number of repetitions the base station transmits and the UE monitors such that the value R may be less than or equal to the value of $R_{max}$.

In some cases, the UE may not explicitly know the duration of the WUS and may miss one or more of the repetitions, R, before starting to monitor for scheduling information or the paging message, thereby reducing the chance of correctly receiving the paging message.

The wireless communication system may support efficient techniques for determining a duration for the WUS. In some cases, the UE may assume a maximum duration for the WUS based on variables associated with the base station and WUS. For example, the maximum duration for the WUS may depend on a transmission power of the WUS, a transmission diversity used by the base station for the WUS, or whether the WUS may be detected prior to the detection of legacy synchronization signals, or any combination thereof.

Figure 5:
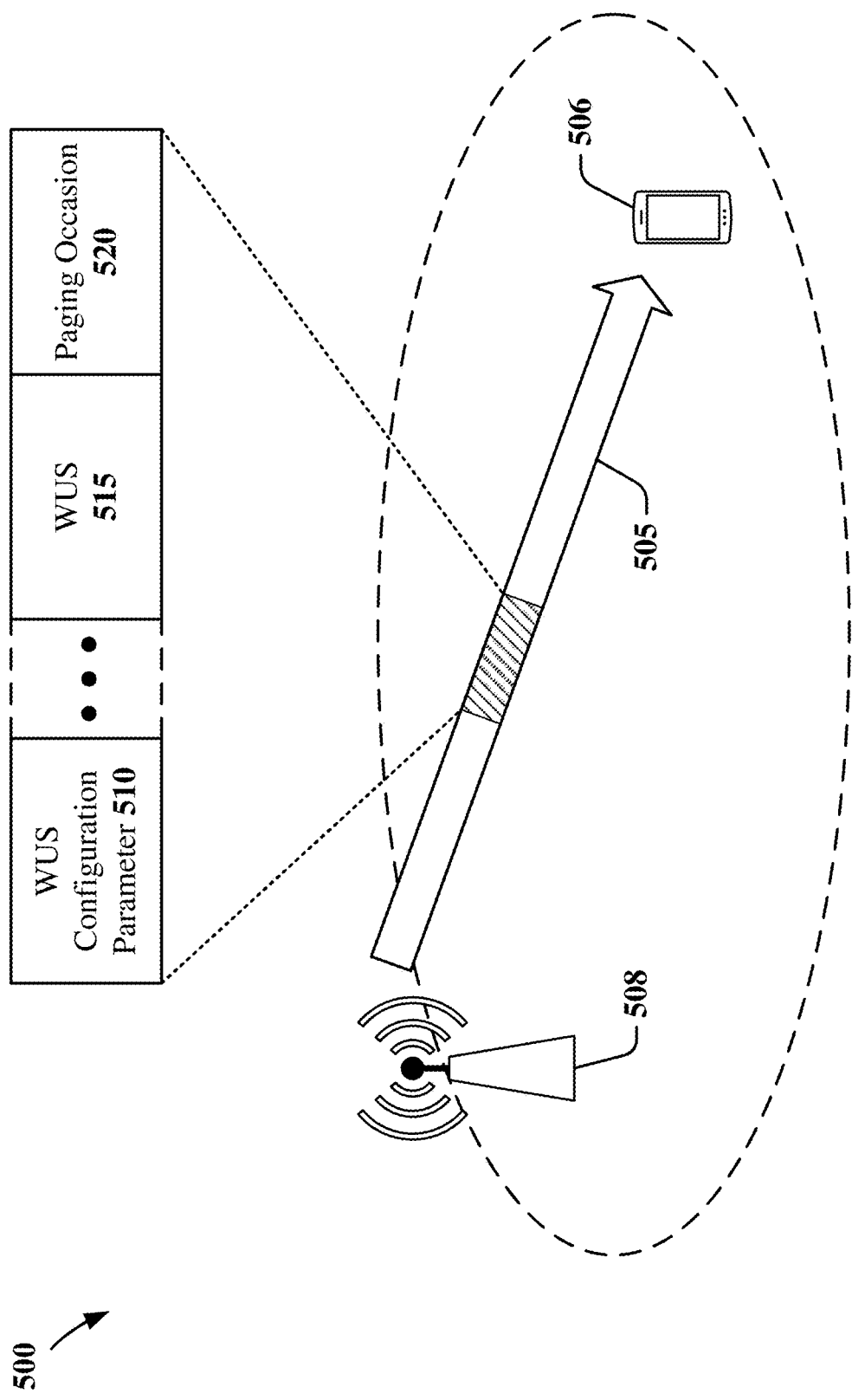
FIG. 5 illustrates an example of a wireless communication system that supports wakeup signal (WUS) configurations for wireless communication according to some aspects.

FIG. 5 illustrates an example of a wireless communication system 500 that supports WUS configurations for wireless communication according to some aspects of the disclosure. In some examples, the wireless communication system 500 may implement aspects of the wireless communication system 100. The wireless communication system 500 may include a base station 508 and a UE 506, which may be examples of the base station 108 and the UE 106, respectively, as described with reference to FIG. 1. The UE 506 may be in communication with the base station 508. In some examples, base station 508 may transmit a WUS 515 and a paging occasion 520 indicating potential data and/or control information for UE 506, which may be transmitted on resources of a downlink channel 505 (e.g., a PDCCH, NPDCCH, or MPDCCH).

In some cases, UE 506 may wake up and monitor for WUS 515 on downlink channel 505 (or a different downlink channel) for scheduling information specific to UE 506 (e.g., including a UE ID for UE 506) in order to monitor for a paging message during paging occasion 520, which may be after expiration of a maximum duration of WUS 515. If UE 506 does not detect WUS 515 before the expiration of the maximum duration, does not receive the scheduling information, or does not detect or receive the paging message in paging occasion 520, UE 506 may revert back to a sleep state. In some cases, the sleep state may be a discontinuous reception (DRX) cycle off state between two DRX cycles, where UE 506 is awake and monitoring for WUS 515 during the DRX cycles. Alternatively, if UE 506 does detect WUS 515 before the expiration of the maximum duration and receives the associated scheduling information, UE 506 may monitor a successive downlink channel 505 (e.g., PDCCH, NPDSCH, or MPDSCH) for data, the paging message, and/or control information. In some cases, UE 506 may remain in the wakeup state after detecting the WUS and monitor downlink channel 505 for the paging message in paging occasion 520 until expiration of a maximum duration of WUS 515. Base station 506 may configure the maximum duration for WUS 515 and indicate the maximum duration to UE 506 (e.g., via a SIB) on a carrier (e.g., NB-IoT carrier or CatM carrier) prior to transmitting WUS 515. The maximum duration may be indicated via a downlink message, such as a WUS configuration parameter 510. In some cases, base station 508 may configure a maximum duration for WUS 515 specific to the carrier. Additionally, WUS configuration parameter 510 may include further information about WUS 515 (e.g., $R_{max}$).

In some cases, UE 506 may assume a maximum duration ($L_{WUS\_max}$) for WUS 515 based on $R_{max}$ or based on variables associated with base station 508 and WUS 515, rather than receiving it via the downlink message. For example, $L_{WUS\_max}$ may depend on a transmission power of WUS 515, a transmission diversity used by base station 508 for WUS 515, whether WUS 515 may be detected prior to the detection of legacy synchronization signals, or any combination thereof. This dependency may be represented by a scaling factor $K_w$, which may be indicated by the base station 508 to the UE 506 via a SIB (e.g., in WUS configuration parameter 510).

In one example, UE 506 may determine $L_{WUS\_max}$ based on a relationship between $R_{max}$ and $K_w$, as follows:

$$L_{WUS\_max}=(R_{max}/K_w)$$

where $R_{max}$=1, 2, 4, 8, 16, 32, 64, 128, 256, 512, 1024, or 2048 and $K_w$=1, 2, 4, 8, 16, 32, 64, or 128. For example, for $R_{max}$=512 and $K_w$=8, $L_{WUS\_max}$=64 (i.e., 512/8=64). In some cases, $L_{WUS\_max}$ may be given in terms of a number of fixed units (e.g., in time) such as a subframe, slot, mini-slot, etc.

Figure 6:
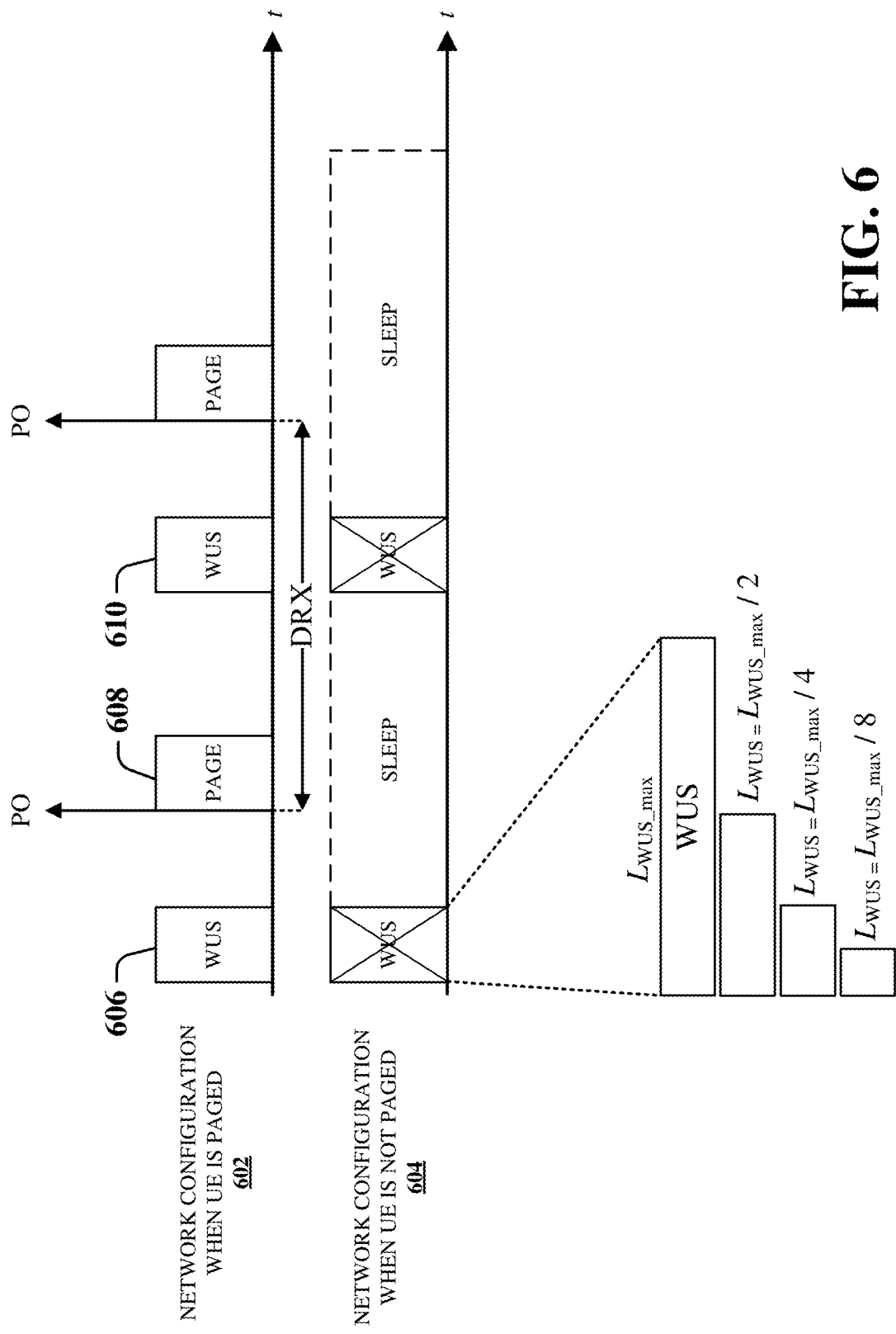
FIG. 6 illustrates a first network configuration when a UE is paged and a second network configuration when a UE is not paged according to some aspects.

FIG. 6 illustrates a first network configuration 602 when a UE is paged and a second network configuration 604 when a UE is not paged according to some aspects of the disclosure. A wakeup signal (WUS) 606 enables idle mode power saving at the UE. In idle mode, the UE is required to wakeup every DRX cycle (for whatever DRX cycle is configured by the network). As such, the WUS 606 allows the UE to reduce unnecessary wakeup to detect a downlink channel (paging signal), e.g., PDCCH, NPDCCH (for NB-IoT carrier), or MPDCCH (for CatM carrier), in every DRX cycle. In particular, the WUS provides information as to whether the UE needs to look for the downlink channel (paging signal) or not. Thus, if the WUS is not present, the UE need not look for the downlink channel (paging signal).

For example, the UE wakes from a sleep state to monitor for the WUS 606. Referring to the first network configuration 602, if the WUS 606 is detected, the UE remains awake to receive a paging signal 608 (e.g., PDCCH, NPDCCH, or MPDCCH) during a paging occasion (PO) corresponding to a data transmission (e.g., PDCCH, NPDSCH, or MPDSCH). This applies for every DRX cycle. Referring to the second network configuration 604, if the WUS 606 is not detected, the UE goes to sleep (e.g., until a time to monitor for another WUS 610) as there is no upcoming paging signal to receive.

Utilizing the WUS is advantageous as it allows a duration of the paging signal to be significantly long depending on a maximum number of repetitions $R_{max}$ set by the network. Thus, time can be saved by quickly determining that the WUS is not present and subsequently refraining from waking to monitor/receive a non-present paging signal.

In an aspect, an actual duration of the WUS ($L_{WUS}$) is not signaled by the network to the UE. The network may only signal the maximum number of repetitions $R_{max}$ and a scaling factor $K_w$ to the UE. As described above, a maximum WUS duration $L_{WUS\_max}$ is proportional to the maximum number of repetitions $R_{max}$ (e.g., maximum number of repetitions of PDCCH, NPDCCH, or MPDCCH). Thus, the UE may determine the maximum WUS duration $L_{WUS\_max}$ by the equation: $L_{WUS\_max}=(R_{max}/K_w)$. However, the actual duration of the WUS ($L_{WUS}$) is not known to the UE.

In an aspect, the actual duration of the WUS ($L_{WUS}$) may have a length of $2^i$ values, e.g., from 1 ms to $L_{WUS\_max}$. For example, as shown in FIG. 1, $L_{WUS}$ may be equal to $L_{WUS\_max}$, $L_{WUS\_max}/2$, $L_{WUS\_max}/4$, or $L_{WUS\_max}/8$. The WUS (606, 610) is only present if a UE group is paged (i.e., if the network transmits a paging signal for the UE to receive). Moreover, a paging probability (probability that the UE will be paged) may be typically low (approximately 10%). Thus, approximately 90% of the time, the WUS is not present for the UE to detect. Nonetheless, the UE may still need to detect the WUS with high probability to avoid missing a paging signal.

In an aspect, a UE may not have knowledge of a signal-to-noise ratio (SNR). Notably, some UEs in a paging group may have good coverage and some UEs in the paging group may have bad coverage. In case a value of $R_{max}$ is large (yielding a large value of $L_{WUS\_max}$) for both types of UEs, even at a high SNR, a UE may still have to monitor for the WUS (606, 610) for an entire maximum WUS duration $L_{WUS\_max}$ to detect a presence or absence of the WUS. Thus, the UE may unnecessarily use power in remaining awake for the entire maximum WUS duration $L_{WUS\_max}$ to monitor for the WUS even when the WUS is not present to be detected.

Figure 7:
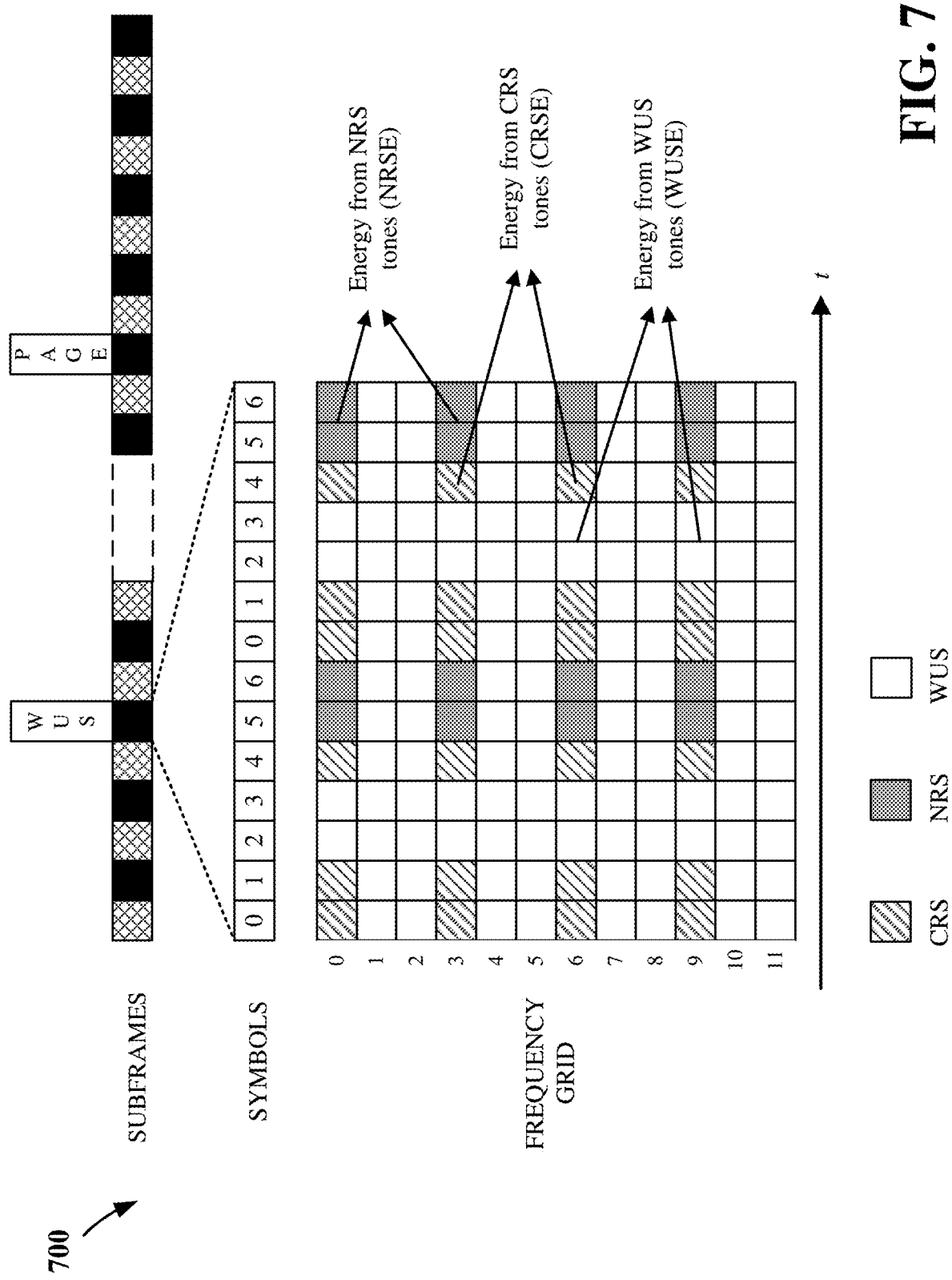
FIG. 7 illustrates a time-frequency resource structure depicting a scheme for detecting a presence or absence of a wakeup signal (WUS) according to some aspects.

FIG. 7 illustrates a time-frequency resource structure 700 depicting a scheme for detecting a presence or absence of a wakeup signal (WUS) according to some aspects of the disclosure. In an anchor carrier for NB-IoT and CatM systems, reference signals (e.g., narrow band reference signals (NRS) for NB-IoT or cell-specific reference signals (CRS) for CatM) may be provided along with the WUS. For example, referring to FIG. 7, resource elements designated for WUS may be punctured to carry the reference signals. Thus, whether or not the WUS is transmitted in a subframe, the reference signals (NRS or CRS) may be present in resource element locations that normally carry the WUS. In an aspect, a UE may utilize the reference signals (RS) in the anchor carrier to early-terminate WUS detection resulting in reduced power consumption and extended battery life at the UE. Early termination of WUS detection may be opportunistic in a non-anchor carrier if NRS is present.

In FIG. 7, a frequency grid is shown for only one subframe. However, aspects of the disclosure contemplate that a network may repeat the transmission of subframes a number of times, e.g., 8 times, 16 times, 64 times, 256 times, etc. To cover deep SNR, the network may repeat transmission of the subframe 64 times, for example. In an aspect, the tone energies of the repeated subframes may be combined.

UEs may detect a WUS in a variety of manners. For example, in an aspect, the UE may detect an energy from one or more tones carrying the reference signals (NRS tone energy (NRSE) or CRS tone energy (CRSE)), detect an energy from one or more tones designated for carrying WUS (WUS tone energy (WUSE)), and determine whether the WUS is present or absent by comparing the WUS tone energy to a threshold based on the NRS tone energy or the CRS tone energy. The NRS tone energy (or CRS tone energy) may be detected based on an accumulation of NRS tones (or CRS tones) across a number of subframes (e.g., repeated subframes), and the WUS tone energy may be detected based on an accumulation of tones designated for carrying the WUS across the number of subframes (e.g., repeated subframes). If the detected WUS tone energy is lower than the threshold based on the detected NRS tone energy (or CRS tone energy), then the UE may determine that the WUS is absent and terminate WUS detection early (e.g., prior to and end of the maximum WUS duration $L_{WUS\_max}$).

In an aspect, the UE utilizes the tone energy of the reference signals to quickly determine (based on a comparison between the WUS tone energy and the threshold based on the reference signal tone energy) whether the WUS is present without needing to monitor for the WUS for an entire maximum WUS duration $L_{WUS\_max}$. As stated above, approximately 90% of the time no paging signal is transmitted, and therefore no WUS, will be present for the UE to receive. Thus, in lieu of the UE monitoring for the WUS for the entire maximum WUS duration $L_{WUS\_max}$, in decent SNR conditions, the UE may evaluate the reference signal tone energy to help determine whether the WUS is present or not. For example, if an accumulated reference signal tone energy is relatively high, an energy baseline or threshold may be set for reliable comparison based on the accumulated reference signal tone energy. Thereafter, an accumulated WUS tone energy is compared to the energy threshold. If the accumulated WUS tone energy is below the energy threshold, then the UE may determine that the WUS is absent. Accordingly, the UE can terminate WUS detection early to save power without waiting until the end of the entire maximum WUS duration $L_{WUS\_max}$. Notably, if the UE does not use the information provided by the reference signal tone energy, then the UE will have to monitor for the WUS until the end of the maximum WUS duration $L_{WUS\_max}$ to be certain that the WUS is present or absent.

Aspects of the disclosure are advantageous over previous methods for detecting WUS. In previous methods, the presence or absence of the WUS is determined by comparing an accumulated WUS tone energy to an energy threshold determined based on background white noise. However, problems may exist with respect to determining the energy threshold. For example, the energy threshold may not increase due to the noise, or the energy threshold may only increase after some accumulation over a period of time. If SNR is unknown, the UE will have to perform noise-based correlation/accumulation for a longer period of time to reliably detect the presence or absence of the WUS to accommodate for white noise variance. In contrast, aspects of the disclosure facilitate reliable determination of the presence or absence of the WUS in a faster manner by comparing the WUS tone energy to a threshold based on a reference signal tone energy. For example, the UE is aware that reference signals are present and may determine a reference signal tone energy (RSE) for an accumulation of reference signals over a number of subframes (e.g., X amount of RSE). If the UE expects the WUS to be present, then the UE may assume that a WUS tone energy for an accumulation of WUS over the number of subframes (e.g., Y amount of WUSE) should be at least be equal to the X amount of RSE (threshold). As such, instead of comparing against a noise-based correlation, the UE has a better estimate of energy (reference signal tone energy) to compare against the WUS tone energy and is able to determine the absence of the WUS in a faster manner.

In particular, if the UE knows that the reference signals (pilots) are always present, then by computing the reference signal tone energy after combining the reference signals across subframes the UE will have a more accurate estimate of how the signal transmission is improving. At high SNR, the reference signal tone energy increases rapidly. If the WUS is present, the WUS tone energy should also increase in a similar manner. If the WUS tone energy does not increase at a rate similar to the reference signal tone energy, then the UE will know that the WUS is not present and may terminate WUS detection early (prior to the end of the maximum WUS duration $L_{WUS\_max}$).

Figure 8:
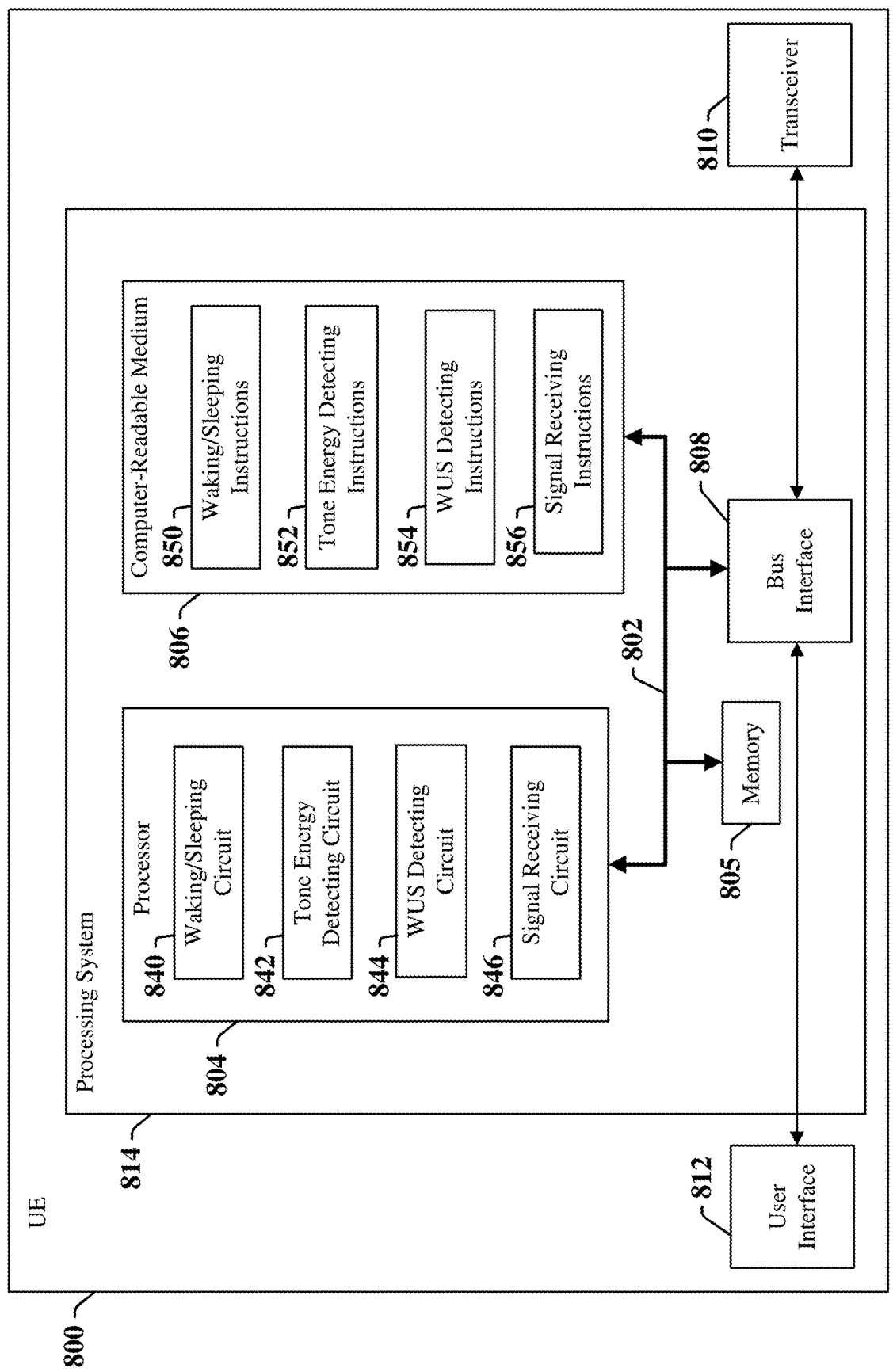
FIG. 8 is a block diagram conceptually illustrating an example of a hardware implementation for a UE according to some aspects.

FIG. 8 is a block diagram illustrating an example of a hardware implementation for an exemplary UE 800 employing a processing system 814. For example, the UE 800 may be a scheduled entity or user equipment (UE), as illustrated in any one or more of FIGS. 1, 2, and/or 5.

The UE 800 may be implemented with a processing system 814 that includes one or more processors 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 800 may be configured to perform any one or more of the functions described herein. That is, the processor 804, as utilized in a UE 800, may be used to implement any one or more of the processes and procedures described below and illustrated in FIG. 9.

In this example, the processing system 814 may be implemented with a bus architecture, represented generally by the bus 802. The bus 802 may include any number of interconnecting buses and bridges depending on the specific application of the processing system 814 and the overall design constraints. The bus 802 communicatively couples together various circuits including one or more processors (represented generally by the processor 804), a memory 805, and computer-readable media (represented generally by the computer-readable medium 806). The bus 802 may also link various other circuits such as timing sources, peripherals, voltage regulators, and power management circuits, which are well known in the art, and therefore, will not be described any further. A bus interface 808 provides an interface between the bus 802 and a transceiver 810. The transceiver 810 provides a communication interface or means for communicating with various other apparatus over a transmission medium. Depending upon the nature of the apparatus, a user interface 812 (e.g., keypad, display, speaker, microphone, joystick) may also be provided. Of course, such a user interface 812 is optional, and may be omitted in some examples, such as a base station.

In some aspects of the disclosure, the processor 804 may include waking/sleeping circuitry 840 configured for various functions, including, for example, waking to monitor for a wakeup signal (WUS), the WUS having a maximum WUS duration and configured to indicate an upcoming transmission of a paging signal corresponding to the WUS, transitioning to a sleep state prior to an end of a maximum WUS duration when a WUS is determined to be absent, and remaining awake when the WUS is determined to be present. For example, the waking/sleeping circuitry 840 may be configured to implement one or more of the functions described below in relation to FIG. 9, including, e.g., blocks 902, 912, and 914. The processor 804 may also include tone energy detecting circuitry 842 configured for various functions, including, for example, detecting a reference signal tone energy from one or more tones carrying reference signals and detecting a WUS tone energy from one or more tones designated for carrying the WUS. For example, the tone energy detecting circuitry 842 may be configured to implement one or more of the functions described below in relation to FIG. 9, including, e.g., blocks 904 and 906. The processor 804 may also include WUS detecting circuitry 844 configured for various functions, including, for example, determining whether the WUS is present or absent based on the WUS tone energy and the reference signal tone energy (e.g., by comparing the WUS tone energy to a threshold determined based on the reference signal tone energy). For example, the WUS detecting circuitry 844 may be configured to implement one or more of the functions described below in relation to FIG. 9, including, e.g., blocks 908 and 910. The processor 804 may also include signal receiving circuitry 846 configured for various functions, including, for example, receiving the paging signal corresponding to the WUS, wherein the paging signal includes control information for receiving an upcoming data transmission, and receiving the data transmission. For example, the signal receiving circuitry 846 may be configured to implement one or more of the functions described below in relation to FIG. 9, including, e.g., block 916.

The processor 804 is responsible for managing the bus 802 and general processing, including the execution of software stored on the computer-readable medium 806. The software, when executed by the processor 804, causes the processing system 814 to perform the various functions described below for any particular apparatus. The computer-readable medium 806 and the memory 805 may also be used for storing data that is manipulated by the processor 804 when executing software.

One or more processors 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806. The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 806 may reside in the processing system 814, external to the processing system 814, or distributed across multiple entities including the processing system 814. The computer-readable medium 806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 806 may include waking/sleeping instructions 850 configured for various functions, including, for example, waking to monitor for a wakeup signal (WUS), the WUS having a maximum WUS duration and configured to indicate an upcoming transmission of a paging signal corresponding to the WUS, transitioning to a sleep state prior to an end of a maximum WUS duration when a WUS is determined to be absent, and remaining awake when the WUS is determined to be present. For example, the waking/sleeping instructions 850 may be configured to implement one or more of the functions described below in relation to FIG. 9, including, e.g., blocks 902, 912, and 914. The computer-readable storage medium 806 may also include tone energy detecting instructions 852 configured for various functions, including, for example, detecting a reference signal tone energy from one or more tones carrying reference signals and detecting a WUS tone energy from one or more tones designated for carrying the WUS. For example, the tone energy detecting instructions 852 may be configured to implement one or more of the functions described below in relation to FIG. 9, including, e.g., blocks 904 and 906. The computer-readable storage medium 806 may also include WUS detecting instructions 854 configured for various functions, including, for example, determining whether the WUS is present or absent based on the WUS tone energy and the reference signal tone energy (e.g., by comparing the WUS tone energy to a threshold determined based on the reference signal tone energy). For example, the WUS detecting instructions 854 may be configured to implement one or more of the functions described below in relation to FIG. 9, including, e.g., blocks 908 and 910. The computer-readable storage medium 806 may also include signal receiving instructions 856 configured for various functions, including, for example, receiving the paging signal corresponding to the WUS, wherein the paging signal includes control information for receiving an upcoming data transmission, and receiving the data transmission. For example, the signal receiving instructions 856 may be configured to implement one or more of the functions described below in relation to FIG. 9, including, e.g., block 916.

Figure 9:
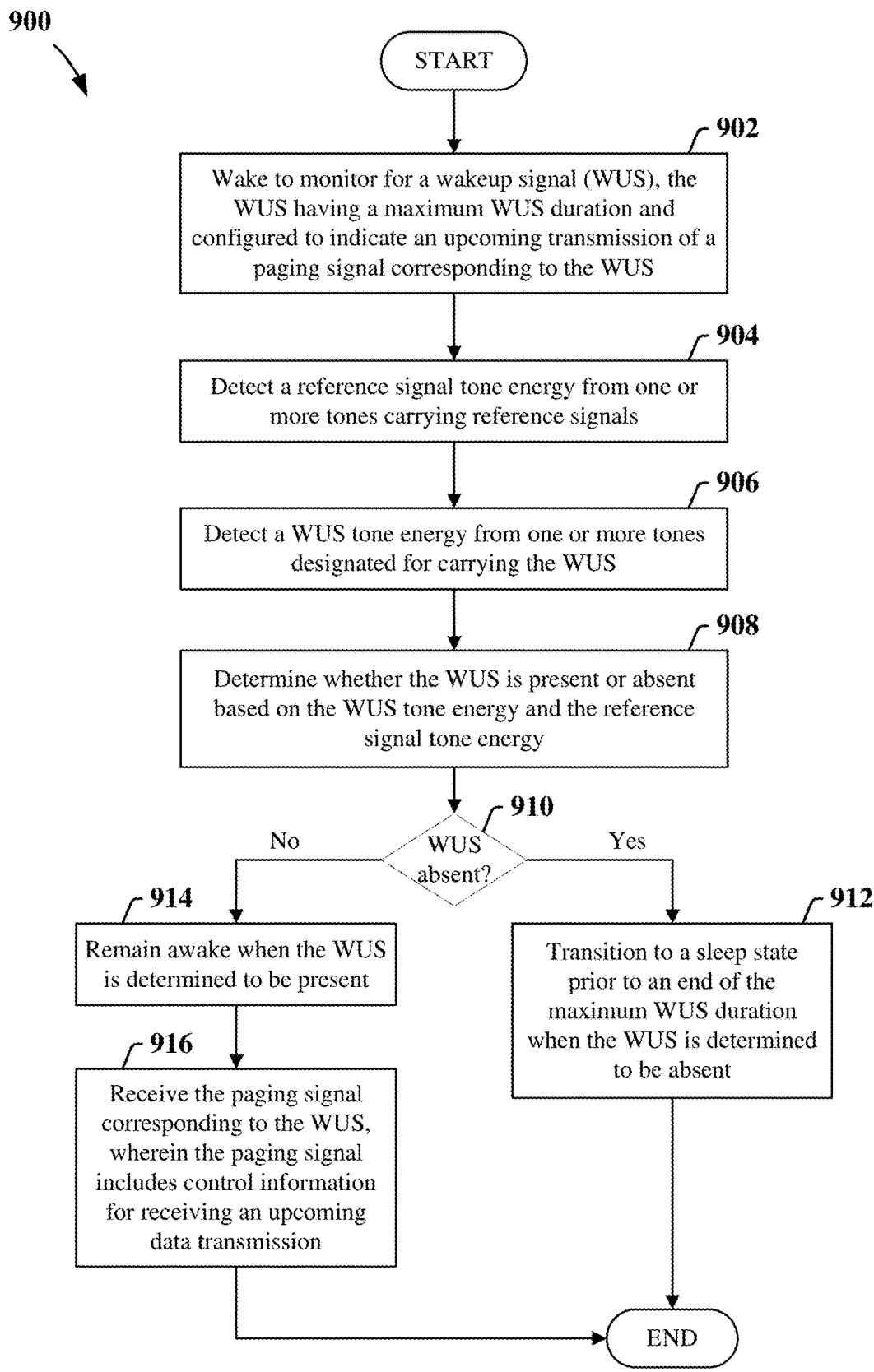
FIG. 9 is a flow chart illustrating an exemplary process for wireless communication at a UE according to some aspects.

FIG. 9 is a flow chart illustrating an exemplary process 900 for wireless communication at a UE in accordance with some aspects of the present disclosure. As described below, some or all illustrated features may be omitted in a particular implementation within the scope of the present disclosure, and some illustrated features may not be required for implementation of all embodiments. In some examples, the process 900 may be carried out by the UE 800 illustrated in FIG. 8. In some examples, the process 900 may be carried out by any suitable apparatus or means for carrying out the functions or algorithm described below.

At block 902, the UE wakes to monitor for a wakeup signal (WUS). The WUS has a maximum WUS duration (e.g., $L_{WUS\_max}$) and is configured to indicate an upcoming transmission of a paging signal (e.g., PDCCH, NPDCCH, or MPDCCH) corresponding to the WUS. The paging signal may include control information for receiving an upcoming data transmission (e.g., PDSCH, NPDSCH, or MPDSCH). The maximum WUS duration ($L_{WUS\_max}$) may be proportional to a maximum number of repetitions for transmitting the paging signal ($R_{max}$).

At block 904, the UE detects a reference signal tone energy from one or more tones carrying reference signals. The reference signals may be narrowband reference signals (NRS) or cell-specific reference signals (CRS), for example. In an aspect, the UE detects the reference signal tone energy by accumulating reference signal tones across a number of repeated subframe transmissions, and combining energies of the accumulated reference signal tones. In another aspect, the UE detects (or computes) the reference signal tone energy by coherently combining received reference signal symbols. For example, the UE may pre-multiply received reference signals with a locally generated copy of a reference signal to form a coherently combined reference signal symbol and determine that an energy of the coherently combined reference signal symbol is the reference signal tone energy.

At block 906, the UE detects a WUS tone energy from one or more tones designated for carrying the WUS. In an aspect, the UE detects the WUS tone energy by accumulating tones designated for carrying the WUS across the number of repeated subframe transmissions, and combining energies of the accumulated tones designated for carrying the WUS. In another aspect, the UE detects (or computes) the WUS tone energy by coherently combining received WUS symbols. For example, the UE may pre-multiply received WUS with a locally generated copy of WUS to form a coherently combined WUS symbol and determine that an energy of the coherently combined WUS symbol is the WUS tone energy.

At block 908, the UE determines whether the WUS is present or absent based on the WUS tone energy and the reference signal tone energy. In an aspect, the UE determines whether the WUS is present or absent by comparing the WUS tone energy to a threshold determined based on the reference signal tone energy. In an aspect, the threshold is at least equal to the combined energies of the accumulated reference signal tones.

At block 910, the UE determines whether the WUS is present or absent based on the determination at block 908. In an aspect, the WUS is present if the WUS tone energy is greater than or equal to the threshold. The WUS is absent if the WUS tone energy is less than the threshold. In another aspect, the UE may determine whether the WUS is present or absent based on the WUS tone energy and the reference signal tone energy using other types of determining methods.

At block 912, if the WUS is determined to be absent, then the UE transitions to a sleep state prior to an end of the maximum WUS duration. Notably, if the UE determines that the WUS is absent, then the UE may also determine that no paging signal corresponding to the WUS will be transmitted from a network.

At block 914, if the WUS is determined to be present, then the UE remains awake. Thereafter, at block 916, the UE receives the paging signal corresponding to the WUS. The UE may further subsequently receive a data transmission (e.g., PDSCH, NPDSCH, or MPDSCH) based on the control information included in the paging signal.

The process shown in FIG. 9 may include additional aspects, such as any single aspect or any combination of aspects described below and/or in connection with one or more other processes described elsewhere herein.

In a first aspect, the UE may detect a reference signal tone energy from one or more tones carrying reference signals and detect a wakeup signal (WUS) tone energy from one or more tones designated for carrying a WUS, the WUS having a maximum WUS duration and configured to indicate an upcoming transmission of a paging signal corresponding to the WUS. The UE may further determine whether the WUS is present or absent based on the WUS tone energy and the reference signal tone energy and transition to a sleep state prior to an end of the maximum WUS duration when the WUS is determined to be absent.

In a second aspect, alone or in combination with the first aspect, the UE may wake to monitor for the WUS.

In a third aspect, alone or in combination with the one or more of the first and second aspects, the UE may further remain awake when the WUS is determined to be present, and receive the paging signal corresponding to the WUS, wherein the paging signal includes control information for receiving an upcoming data transmission.

In a fourth aspect, alone or in combination with one or more of the first through third aspects, the UE determines whether the WUS is present or absent by comparing the WUS tone energy to a threshold determined based on the reference signal tone energy, wherein the WUS is present if the WUS tone energy is greater than or equal to the threshold, and the WUS is absent if the WUS tone energy is less than the threshold.

In a fifth aspect, alone or in combination with one or more of the first through fourth aspects, the reference signals are narrowband reference signals (NRS) or cell-specific reference signals (CRS).

In a sixth aspect, alone or in combination with one or more of the first through fifth aspects, the UE detects the reference signal tone energy by accumulating reference signal tones across a number of repeated subframe transmissions, and combining energies of the accumulated reference signal tones.

In a seventh aspect, alone or in combination with one or more of the first through sixth aspects, the UE detects the WUS tone energy by accumulating tones designated for carrying the WUS across the number of repeated subframe transmissions, and combining energies of the accumulated tones designated for carrying the WUS.

In an eighth aspect, alone or in combination with one or more of the first through seventh aspects, the threshold is at least equal to the combined energies of the accumulated reference signal tones.

In a ninth aspect, alone or in combination with one or more of the first through eighth aspects, the maximum WUS duration is proportional to a maximum number of repetitions for transmitting the paging signal.

In one configuration, the apparatus 800 for wireless communication includes means for waking to monitor for a wakeup signal (WUS), the WUS having a maximum WUS duration and configured to indicate an upcoming transmission of a paging signal corresponding to the WUS, means for detecting a reference signal tone energy from one or more tones carrying reference signals, means for detecting a WUS tone energy from one or more tones designated for carrying the WUS, means for comparing the WUS tone energy to a threshold determined based on the reference signal tone energy, means for determining whether the WUS is present or absent based on the comparison, means for determining whether the WUS is present or absent based on the WUS tone energy and the reference signal tone energy, means for transitioning to a sleep state prior to an end of the maximum WUS duration when the WUS is determined to be absent, means for remaining awake when the WUS is determined to be present, and means for receiving the paging signal corresponding to the WUS, wherein the paging signal includes control information for receiving an upcoming data transmission. In one aspect, the aforementioned means may be the processor 804 shown in FIG. 8 configured to perform the functions recited by the aforementioned means. In another aspect, the aforementioned means may be a circuit or any apparatus configured to perform the functions recited by the aforementioned means.

Of course, in the above examples, the circuitry included in the processor 804 is merely provided as an example, and other means for carrying out the described functions may be included within various aspects of the present disclosure, including but not limited to the instructions stored in the computer-readable storage medium 806, or any other suitable apparatus or means described in any one of the FIGS. 1, 2, and/or 5 and utilizing, for example, the processes and/or algorithms described herein in relation to FIG. 9.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-9 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-9 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication at a user equipment (UE), comprising:
   detecting a reference signal tone energy from one or more tones carrying reference signals;
   detecting a wakeup signal (WUS) tone energy from one or more tones designated for carrying a WUS, the WUS having a maximum WUS duration and configured to indicate an upcoming transmission of a paging signal corresponding to the WUS, wherein the detecting the WUS tone energy comprises at least one of:
      accumulating tones designated for carrying the WUS across a number of repeated subframe transmissions and combining energies of the accumulated tones designated for carrying the WUS, or
      pre-multiplying the accumulated tones designated for carrying the WUS with a copy of a WUS generated at the UE to form a coherently combined WUS symbol and determining an energy of the coherently combined WUS symbol to be the WUS tone energy;
   determining whether the WUS is present or absent based on the WUS tone energy and the reference signal tone energy; and
   transitioning to a sleep state prior to an end of the maximum WUS duration when the WUS is determined to be absent.

2. The method of claim 1, further comprising waking to monitor for the WUS.

3. The method of claim 2, further comprising:
   remaining awake when the WUS is determined to be present; and
   receiving the paging signal corresponding to the WUS, wherein the paging signal includes control information for receiving an upcoming data transmission.

4. The method of claim 1, wherein the determining whether the WUS is present or absent comprises comparing the WUS tone energy to a threshold determined based on the reference signal tone energy, wherein:
   the WUS is present if the WUS tone energy is greater than or equal to the threshold; and
   the WUS is absent if the WUS tone energy is less than the threshold.

5. The method of claim 4, wherein the detecting the reference signal tone energy comprises at least one of:
   accumulating reference signal tones across the number of repeated subframe transmissions and combining energies of the accumulated reference signal tones; or
   pre-multiplying the accumulated reference signal tones with a copy of a reference signal generated at the UE to form a coherently combined reference signal symbol and determining an energy of the coherently combined reference signal symbol to be the reference signal tone energy.

6. The method of claim 5, wherein the threshold is at least equal to the combined energies of the accumulated reference signal tones.

7. The method of claim 1, wherein the maximum WUS duration is proportional to a maximum number of repetitions for transmitting the paging signal.

8. A user equipment (UE) for wireless communication, comprising:
   at least one processor;
   a transceiver communicatively coupled to the at least one processor; and
   a memory communicatively coupled to the at least one processor, wherein the at least one processor and the memory are configured to:
      detect a reference signal tone energy from one or more tones carrying reference signals,
      detect a wakeup signal (WUS) tone energy from one or more tones designated for carrying a WUS, the WUS having a maximum WUS duration and configured to indicate an upcoming transmission of a paging signal corresponding to the WUS, wherein the at least one processor and the memory configured to detect the WUS tone energy is configured to at least one of:
         accumulate tones designated for carrying the WUS across a number of repeated subframe transmissions and combine energies of the accumulated tones designated for carrying the WUS, or
         pre-multiply the accumulated tones designated for carrying the WUS with a copy of a WUS generated at the UE to form a coherently combined WUS symbol and determine an energy of the coherently combined WUS symbol to be the WUS tone energy,
      determine whether the WUS is present or absent based on the WUS tone energy and the reference signal tone energy, and
      transition to a sleep state prior to an end of the maximum WUS duration when the WUS is determined to be absent.

9. The UE of claim 8, wherein the at least one processor and the memory are further configured to wake to monitor for the WUS.

10. The UE of claim 9, wherein the at least one processor and the memory are further configured to:
    remain awake when the WUS is determined to be present; and
    receive the paging signal corresponding to the WUS, wherein the paging signal includes control information for receiving an upcoming data transmission.

11. The UE of claim 8, wherein the at least one processor and the memory configured to determine whether the WUS is present or absent is configured to compare the WUS tone energy to a threshold determined based on the reference signal tone energy, wherein:
    the WUS is present if the WUS tone energy is greater than or equal to the threshold; and
    the WUS is absent if the WUS tone energy is less than the threshold.

12. The UE of claim 11, wherein the at least one processor and the memory configured to detect the reference signal tone energy is configured to at least one of:

accumulate reference signal tones across the number of repeated subframe transmissions and combine energies of the accumulated reference signal tones; or pre-multiply the accumulated reference signal tones with a copy of a reference signal generated at the UE to form a coherently combined reference signal symbol and determine an energy of the coherently combined reference signal symbol to be the reference signal tone energy.

13. The UE of claim 12, wherein the threshold is at least equal to the combined energies of the accumulated reference signal tones.

14. The UE of claim 8, wherein the maximum WUS duration is proportional to a maximum number of repetitions for transmitting the paging signal.

15. A user equipment (UE) for wireless communication, comprising:
means for detecting a reference signal tone energy from one or more tones carrying reference signals;
means for detecting a wakeup signal (WUS) tone energy from one or more tones designated for carrying a WUS, the WUS having a maximum WUS duration and configured to indicate an upcoming transmission of a paging signal corresponding to the WUS, wherein the means for detecting the WUS tone energy is configured to at least one of:
accumulate tones designated for carrying the WUS across a number of repeated subframe transmissions and combine energies of the accumulated tones designated for carrying the WUS, or
pre-multiply the accumulated tones designated for carrying the WUS with a copy of a WUS generated at the UE to form a coherently combined WUS symbol and determine an energy of the coherently combined WUS symbol to be the WUS tone energy;
means for determining whether the WUS is present or absent based on the WUS tone energy and the reference signal tone energy; and
means for transitioning to a sleep state prior to an end of the maximum WUS duration when the WUS is determined to be absent.

16. The UE of claim 15, further comprising means for waking to monitor for the WUS.

17. The UE of claim 16, further comprising:
means for remaining awake when the WUS is determined to be present; and
means for receiving the paging signal corresponding to the WUS, wherein the paging signal includes control information for receiving an upcoming data transmission.

18. The UE of claim 15, wherein the means for determining whether the WUS is present or absent comprises means for comparing the WUS tone energy to a threshold determined based on the reference signal tone energy, wherein:
the WUS is present if the WUS tone energy is greater than or equal to the threshold; and
the WUS is absent if the WUS tone energy is less than the threshold.

19. The UE of claim 18, wherein the means for detecting the reference signal tone energy is configured to at least one of:
accumulate reference signal tones across the number of repeated subframe transmissions and combine energies of the accumulated reference signal tones; or
pre-multiply the accumulated reference signal tones with a copy of a reference signal generated at the UE to form a coherently combined reference signal symbol and determine an energy of the coherently combined reference signal symbol to be the reference signal tone energy.

20. The UE of claim 19, wherein the threshold is at least equal to the combined energies of the accumulated reference signal tones.

21. The UE of claim 15, wherein the maximum WUS duration is proportional to a maximum number of repetitions for transmitting the paging signal.

22. A non-transitory computer-readable medium storing computer-executable code at a user equipment (UE) for wireless communication, comprising code for causing a computer to:
detect a reference signal tone energy from one or more tones carrying reference signals;
detect a wakeup signal (WUS) tone energy from one or more tones designated for carrying the WUS, the WUS having a maximum WUS duration and configured to indicate an upcoming transmission of a paging signal corresponding to the WUS, wherein the code for causing the computer to detect the WUS tone energy is configured to at least one of:
accumulate tones designated for carrying the WUS across a number of repeated subframe transmissions and combine energies of the accumulated tones designated for carrying the WUS, or
pre-multiply the accumulated tones designated for carrying the WUS with a copy of a WUS generated at the UE to form a coherently combined WUS symbol and determine an energy of the coherently combined WUS symbol to be the WUS tone energy;
determine whether the WUS is present or absent based on the WUS tone energy and the reference signal tone energy; and
transition to a sleep state prior to an end of the maximum WUS duration when the WUS is determined to be absent.

23. The non-transitory computer-readable medium of claim 22, further comprising code for causing a computer to wake to monitor for the WUS.

24. The non-transitory computer-readable medium of claim 23, further comprising code for causing a computer to:
remain awake when the WUS is determined to be present; and
receive the paging signal corresponding to the WUS, wherein the paging signal includes control information for receiving an upcoming data transmission.

25. The non-transitory computer-readable medium of claim 22, wherein the code for causing the computer to determine whether the WUS is present or absent is configured to compare the WUS tone energy to a threshold determined based on the reference signal tone energy, wherein:
the WUS is present if the WUS tone energy is greater than or equal to the threshold; and
the WUS is absent if the WUS tone energy is less than the threshold.

26. The non-transitory computer-readable medium of claim 25, wherein:
the code for causing the computer to detect the reference signal tone energy is configured to at least one of:
accumulate reference signal tones across the number of repeated subframe transmissions and combine energies of the accumulated reference signal tones, or
pre-multiply the accumulated reference signal tones with a copy of a reference signal generated at the UE to form a coherently combined reference signal symbol and determine an energy of the coherently combined reference signal symbol to be the reference signal tone energy.

27. The non-transitory computer-readable medium of claim 26, wherein the threshold is at least equal to the combined energies of the accumulated reference signal tones.

\* \* \* \* \*